United States Patent
Fischer et al.

(10) Patent No.: US 11,288,279 B2
(45) Date of Patent: *Mar. 29, 2022

(54) COGNITIVE COMPUTER ASSISTED ATTRIBUTE ACQUISITION THROUGH ITERATIVE DISCLOSURE

(71) Applicant: International Business Machines Corporation, Armonk, NY (US)

(72) Inventors: Verlyn M. Fischer, Cedar Park, TX (US); John B. Gordon, Austin, TX (US); Mark G. Megerian, Rochester, MN (US); Adam M. Tate, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/742,286

(22) Filed: Jan. 14, 2020

(65) Prior Publication Data

US 2020/0151186 A1 May 14, 2020

Related U.S. Application Data

(63) Continuation of application No. 15/162,923, filed on May 24, 2016, now Pat. No. 10,585,902.

(51) Int. Cl.
*G06F 16/2457* (2019.01)

(52) U.S. Cl.
CPC .............. *G06F 16/24578* (2019.01)

(58) Field of Classification Search
CPC ............ G06F 16/24578; G06F 17/3053
USPC ........................................ 707/728
See application file for complete search history.

(56) References Cited

U.S. PATENT DOCUMENTS

| | | | |
|---|---|---|---|
| 7,529,737 B2 | 5/2009 | Aphinyanaphongs et al. | |
| 7,668,813 B2 | 2/2010 | Baeza-Yates | |
| 8,620,848 B1 | 12/2013 | Komissarchik et al. | |
| 9,542,532 B1* | 1/2017 | McNair ................. | G16H 70/20 |
| 2005/0060199 A1* | 3/2005 | Siegel ................... | G16H 40/67 |
| | | | 705/2 |

(Continued)

FOREIGN PATENT DOCUMENTS

| | | |
|---|---|---|
| EP | 2120192 A1 | 11/2009 |
| WO | 2009037646 A2 | 3/2009 |
| WO | 2014174404 A1 | 10/2014 |

OTHER PUBLICATIONS

Demner-Fushman et al., "What can natural language processing do for clinical decision support?" Journal of Biomedical Informatics, Elsevier, 2009, http://www.ncbi.nlm.nih.gov/pmc/articles/PMC2757540/pdf/nihms145183.pdf.

(Continued)

*Primary Examiner* — Kuen S Lu
(74) *Attorney, Agent, or Firm* — Terrile, Cannatti & Chambers, LLP; Michael Rocco Cannatti

(57) ABSTRACT

A method, system, and computer program product are provided for displaying query items (e.g., patient attributes) and answers (e.g., treatment recommendations) by performing a ranking analysis of query items by running a cognitive analysis comparison of each marginal answer confidence improvement metric for each unspecified query item in the first plurality of query items to rank the query items in sorted order from largest to smallest marginal answer confidence improvement metric.

24 Claims, 9 Drawing Sheets

(56) References Cited

U.S. PATENT DOCUMENTS

| | | | |
|---|---|---|---|
| 2008/0189139 A1* | 8/2008 | Sachdeva | G06Q 10/10 |
| | | | 705/3 |
| 2010/0299126 A1* | 11/2010 | Chugunov | G01V 11/00 |
| | | | 703/10 |
| 2011/0001850 A1* | 1/2011 | Gaubatz | G06K 9/00604 |
| | | | 348/241 |
| 2013/0073983 A1* | 3/2013 | Rasmussen | G06Q 50/01 |
| | | | 715/753 |
| 2013/0268203 A1 | 10/2013 | Pyloth | |
| 2014/0046694 A1 | 2/2014 | White | |
| 2014/0172756 A1 | 6/2014 | Clark et al. | |
| 2015/0235131 A1 | 8/2015 | Allen et al. | |
| 2015/0310177 A1 | 10/2015 | Csurka et al. | |
| 2016/0232321 A1* | 8/2016 | Silverman | G16H 50/50 |

OTHER PUBLICATIONS

R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. ¾, May/Jul. 2012, http://ieeexplore.ieee.org/xpl/tocresult.jsp?reload=true&isnumber=6177717.
List of IBM Patents or Applications Treated as Related, 2020.

\* cited by examiner

COGNITIVE COMPUTER ASSISTED ATTRIBUTE ACQUISITION THROUGH ITERATIVE DISCLOSURE

BACKGROUND OF THE INVENTION

In the field of artificially intelligent computer systems capable of answering questions posed in natural language, cognitive question answering (QA) systems (such as the IBM Watson™ artificially intelligent computer system and/ or other natural language question answering systems) process questions posed in natural language to determine answers and associated confidence scores based on knowledge acquired by the QA system. Such cognitive QA systems provide powerful tools that can be used in a variety of different applications or fields, such as financial, medical, scientific research, engineering, software, and the like. While there remain challenges with processing the ever increasing amount of unstructured data (such as, for example, the research data, medical records, clinical trials, etc. in the medical field), there are also significant challenges with evaluating the processing results, such as selecting an answer or conclusion from a large, but finite list of possibilities gathered through random acquisition of deterministic factors from a large, finite body of unknown attributes. For example, the decision support process used to make medical treatment recommendations often relies on patient attributes as query parameters that do not effectively reduce the uncertainty of the treatment recommendations or answers. While cognitive QA systems can provide computational power to assimilate and analyze the meaning and context of structured and unstructured data (such as clinical notes, reports, and key patient information) to generate a wealth of candidate treatment option recommendations, the clinical decision making process can actually be impaired when the most valuable patient attributes are not used to select treatment recommendations. Existing solutions for computer assisted decision-making have been limited to operating with structured data (e.g., Bayesian Network decision support systems) or have been narrowly applied (e.g., using correlation engines to map symptoms to diseases), but such solutions do not prioritize the information acquisition used to optimize the decision-making process in support of decision outcomes, such as treatment recommendations. As a result, the existing solutions for efficiently and accurately processing and evaluating queries against large and complex amounts of unstructured data to improve the quality of generated answers are extremely difficult at a practical level.

SUMMARY

Broadly speaking, selected embodiments of the present disclosure provide a system, method, and apparatus for optimizing the acquisition of query attributes by implementing iterative disclosure techniques with the cognitive power of the information handling system to evaluate user queries against large unstructured data sets using natural language processing to return responses and associated confidence values which are used to iteratively guide the user's query submissions to acquire the most valuable query attributes in ranked order by the number of possible conclusions that can be deprioritized b the attribute that would significantly improve the selection process. As an initial step in selected embodiments of the present disclosure, the information handling system identifies, retrieves, processes, and/or combines query attributes from a user (e.g., patient attributes). Evaluating the query attributes against a large unstructured data set, the information handling system returns responses and confidence values, such as by applying one or more learning methods to identify and rank additional query attributes and potential responses or answers (e.g., treatment plans or recommendations) from unstructured data based on associated confidence values. To this end, vector representations of the query attributes (e.g., patient attribute vectors) may be mapped to vector representations of the response confidence values (e.g., treatment confidence vectors) and computationally processed to derive confidence volume metrics to represent the confidence uncertainty for a given set of responses and query attributes. Based on the confidence volume metrics or a normalized representation thereof, the information handling system can prioritize additional query attribute information to be provided by the user to most effectively reduce the uncertainty in the confidence values for a set of responses or answers. For example, the confidence volume metric may be computed as the product of option confidence ranges for each query attribute or piece of information, and then each query attribute or information can be ranked based on a marginal reduction in the confidence volume metric.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
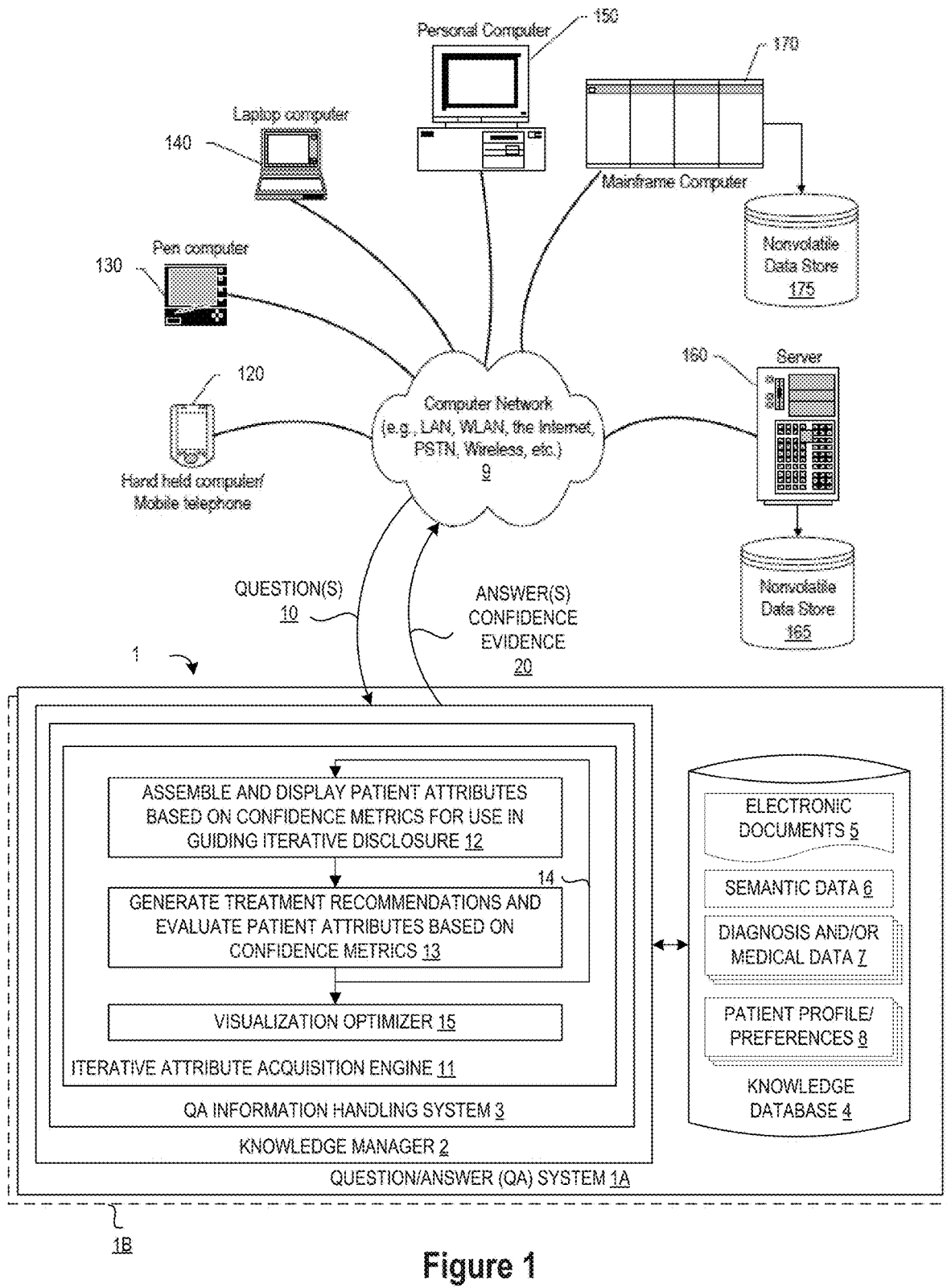
FIG. 1 depicts a system diagram of an information handling system connected in a network environment that uses an iterative attribute acquisition engine to optimize and guide the iterative acquisition of query attributes for use in generating treatment recommendations.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention, Thus embodied, the disclosed system, method, and/or a computer program product are operative to improve the functionality and operation of a cognitive question answering (QA) system by optimizing the identification of query attributes which will improve the confidence scores for answers generated by the cognitive QA system, thereby providing a more efficient and accurate decision-making interface.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing, A computer readable storage medium, as used herein, is not to be construed as being transitory signals per se, such as radio waves or other freely propagating electromagnetic waves, electromagnetic waves propagating through a waveguide or other transmission media light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 1 connected across a computer network 9 to a plurality of computing devices (e.g., 120, 130, 140), where the QA system 100 uses an iterative attribute acquisition engine 11 to optimize and guide the iterative acquisition of query attributes that are used to generate treatment recommendations. The QA system 1 may include one or more QA system pipelines 1A, 1B, each of which includes a knowledge manager computing device 2 (comprising one or more processors and one or more memories, and potentially any other computing device elements generally known in the art including buses, storage devices, communication interfaces, and the like) for processing questions received over the network 9 from one or more users at computing devices (e.g., 120, 130, 140). Over the network 9, the computing devices communicate with each other and with other devices or components via one or more wired and/or wireless data communication links, where each communication link may comprise one or more of wires, routers, switches, transmitters, receivers, or the like. In this networked arrangement, the QA system 1 and network 9 may enable question/answer (QA) generation functionality for one or more content users. Other embodiments of QA system 1 may be used with components, systems, sub-systems, and/or devices other than those that are depicted herein.

In the QA system 1, the knowledge manager 2 may be configured to receive inputs from various sources. For example, knowledge manager 2 may receive input from the network 9, one or more knowledge databases or corpora 4 of electronic documents 5, semantic data 6, or other data, content users, and other possible sources of input, such as diagnosis and/or medical data 7 or patient profile/preference data 8. In selected embodiments, the knowledge base 4 may include structured, semi-structured, and/or unstructured content in a plurality of documents that are contained in one or more large knowledge databases or corpora. The various computing devices (e.g., 120, 130, 140) on the network 9 may include access points for content creators and content users. Some of the computing devices may include devices for a database storing the corpus of data as the body of information used by the knowledge manager 2 to generate answers to cases. The network 9 may include local network connections and remote connections in various embodiments, such that knowledge manager 2 may operate in environments of any size, including local and global, e.g., the Internet. Additionally, knowledge manager 2 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in an electronic document 5 for use as part of a corpora 4 of data with knowledge manager 2. The corpora 4 may include any structured and unstructured documents, including but not limited to any file, text, article, or source of data (e.g., scholarly articles, dictionary definitions, encyclopedia references, and the like) for use in knowledge manager 2. Content users may access knowledge manager 2 via a network connection or an Internet connection to the network 9, and may input questions to knowledge manager 2 that may be answered by the content in the corpus of data. As will be appreciated, when a process evaluates a given section of a document for semantic content, the process can use a variety of conventions to query it from the knowledge manager. One convention is to send a well-formed question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 2. Knowledge manager 2 may interpret the question and provide a response to the content user containing one or more answers 20 to the question 10. In some embodiments, knowledge manager 2 may provide a response to users in a ranked list of answers 20 which include associated confidence values and supporting evidence.

In some illustrative embodiments, QA system 1 may be the IBM Watson™ QA system available from International Business Machines Corporation of Armonk, N.Y., which is augmented with the mechanisms of the illustrative embodiments described hereafter. The IBM Watson™ knowledge manager system may receive an input question 10 which it then parses to extract the major features of the question, that in turn are then used to formulate queries that are applied to the corpus of data stored in the knowledge base 4. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ A system 1 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 1 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012. Another example QA system 1 is the IBM Watson for Oncology™ cognitive computing system which is designed to support oncology physicians as they consider treatment options with their patients by analyzing a patient's medical information against a vast array of data and expertise to interpret the cancer patients' clinical information and identify individualized, evidence-based treatment options.

To process and answer questions, the QA system 1 may include an information handling system 3 which uses an iterative attribute acquisition engine 11 to iteratively guide query submissions to generate treatment recommendations by assembling patient attributes which are mapped to treatment confidence metrics, submitting the patient attributes as query submissions to the information handling system, evaluating the patient attributes and confidence metrics at the information handling system using machine learning techniques to identify potential treatment plans or recommendations for a patient, selecting additional patient attributes for input as additional query submissions which will most effectively reduce the uncertainty in the treatment confidence metrics, and then continuing to submit the patient attributes as query submissions to the information handling system in an iterative disclosure sequence until one or more treatment plans or recommendations are selected for display, comparison, and evaluation by the patient. Though shown as being embodied in or integrated with the QA system 1, the information handling system 3 and/or iterative attribute acquisition engine 11 may be implemented in whole or in part in a separate computing system (e.g., 150) that is connected across a network 9 to the QA system 1. Wherever embodied, the cognitive power of the iterative attribute acquisition engine 11 processes input patient attribute data from the physician diagnosis and patient medical data to generate candidate treatment recommendations, evaluates the input patient attribute data on the basis of confidence metrics to generate treatment outcomes specified by the patient profile, preference, and/or patient attribute data, and then generates an optimized visualization of the treatment recommendations. As will be appreciated, the iterative attribute acquisition techniques disclosed herein may be used in other applications besides making medical treatment recommendations based on patient attribute data In selected example embodiments, the iterative attribute acquisition engine 11 may include an assembly system, module or interface 12 which uses confidence metric values to assemble query attributes for use in iteratively guiding query submissions to the QA system 1. In selected embodiments, the query attributes may be patient attributes relating to a patient's medical information or data, such as the diagnostic data from the physician, clinical expertise, external research, or other medical data, Examples of such patient medical information or data include, but are not limited to basic patient demographic information (e.g., age and gender), the patient's electronic medical record (e.g., weight, height, blood pressure, vitals, problems/diagnoses, medications, allergies, patient charts, documents, vaccinations, lab results, confidential notes, images, etc.), medical conditions (e.g., dyspnea, hemoglobin, bronchoscopy, blood creatinine, parathyroid hormones, foot numbness, polysomnography, urinalysis, etc.), and/or the patient's diagnosis result (e.g., current tumor size or prognosis, etc.). As an alternative to providing an assembly system, module or interface 12, the patient attributes relating to a patient's medical information or data may have already been stored by the QA system 1 during the patient's previous visit. In yet other embodiments, the query attributes may be related to other fields of investigation, such as finances, medicine, scientific research, engineering, software, and the like. However assembled or received, the assembly system, module or interface 12 displays the patient attributes for use in guiding the iterative disclosure of query submissions, such as by displaying a listing of patient attributes ranked by confidence metric values, where each ranked patient attribute may be individually selected by the user (e.g., medical technician) for submission of additional data or information relating to the selected patient attribute.

Upon receiving or otherwise obtaining the input patient attribute data or information, the iterative attribute acquisition engine 11 may be configured to evaluate the patient attributes and generate treatment recommendations based on associated treatment confidence metric values. To this end, the iterative attribute acquisition engine 11 may include a treatment recommendation system, module or interface 13 that is configured to apply natural language processing (NLP) techniques, such as machine learning and/or deep analytic analysis, to evaluate patient attributes that are input by the physician and/or extracted from the patient's medical data and diagnostic data along with associated treatment confidence metric values, and to generate therefrom treatment recommendations for this medical case, where each recommended treatment includes one or more specified treatment outcomes, such as potential side-effects, cost, and patient's survival rate. Typically, the output generated by the treatment recommendation system 13 may include multiple, different treatment options, each having an associated treatment confidence metric value and listing of supporting evidence to assist the physician in making informed treatment decisions. However, the large number of treatment options can overwhelm the physician or patient's decision-making process which must consider the attributes or side effects of the many disparate treatments along with the patient's personal medical record information, particularly in the stressful context of making health decisions when the patient is stressed, injured, or sick. In addition, the quality or accuracy of the treatment recommendations (as represented by the treatment confidence metric values) may be limited by the completeness or accuracy of the available patient attribute data. For example, an incomplete assembly of patient attribute data will result in less accurate treatment recommendations than would be generated from a complete picture of the patent's attributes. To improve the assembly of patent attribute data, conventional decision support systems require that the physician or expert must use their own knowledge and experience to determine which information to obtain in what priority to best improve the confidence scores for all treatment recommendations.

To improve the accuracy and efficiency of generating treatment recommendations, the treatment recommendation system, module or interface 13 may be configured to apply NLP techniques to the patient attributes and associated treatment confidence metric values in order to prioritize and identify the patient attribute information that should be entered to most effectively reduce the uncertainty in the confidence values for the treatment recommendations. In selected embodiments, a machine learning processing prioritizes patient attributes or information by computing or deriving a treatment confidence volume metric (which can refer to an area, volume or hyper-value, depending on the number of attributes) and/or a normalized representation of the treatment confidence volume metric (also referred to as a Customer Care Measure (CCM)), both of which provide different measures of the uncertainty in the confidence values for the treatment options provided.

As disclosed herein, the treatment recommendation system, module or interface 13 may compute the treatment confidence volume metric values as the product of option confidence ranges for each patient attribute or piece of information. The larger the treatment confidence volume metric, the greater the confidence uncertainty about the treatment recommendation. And conversely, the smaller the treatment confidence volume metric, the greater the confidence certainty about the treatment recommendation. Once computed, the treatment confidence volume metric can be used to rank the patient attributes or information based on a marginal reduction in the confidence volume by prioritizing the attributes which will most effectively reduce the confidence uncertainty about the treatment recommendation.

As further disclosed herein, the treatment recommendation system, module or interface 13 may compute the normalized treatment confidence volume metric (CCM) value as a number between 0 and 1 with the equation $CCM=1-(Vknown/Vempty)$, where Vknown is the confidence volume for a set of known attributes (represented by the vector a') and where Vempty is the confidence volume when no patient attributes are known. Once computed, the CCM value can be used to rank additional patient attribute input and also to provide a reference point indication of the number of known patient attributes.

As further disclosed herein, the treatment recommendation system, module or interface 13 may compute a marginal improvement in the customer care measure to determine how much uncertainty can be reduced by providing additional patient attribute data for a selected patient attribute. In selected embodiments, the marginal increase in the CCM value (MCCM) for an attribute A may be calculated from confidence volume values as $MCCM=(V_A-Vknown)/Vempty$, where $V_A$ is the confidence volume for a set of known attributes and one additional attribute A, Vknown is the confidence volume for a set of known attributes (represented by the vector a'), and where Vempty is the confidence volume when no patient attributes are known.

As indicated by the feedback path 14, the additional patient attribute information and treatment confidence volume metric values are fed back to the assembly system, module or interface 12 for use in assembling and displaying patient attributes to be used in a guided iterative disclosure approach for submitting additional queries. With this feedback information, the assembly system, module or interface 12 may be configured to determine the display priority and visualization attributes of patient attributes and treatment recommendations based on the treatment confidence volume metric values computed at the treatment recommendation system, module or interface 13. For example, the patient attribute data collected as a first set of patient attribute data during an initial pass through the assembly system, module or interface 12 may be used to specify a first set of treatment recommendations or outcomes having a first set of associated treatment confidence metric values. However, the evaluation and prioritization of the patient attributes (and associated treatment confidence metric values) at the treatment recommendation system, module or interface 13 can result in a second, different set of patient attributes and/or treatment recommendations being displayed for selection and input during a second pass through the assembly system, module or interface 12, where the set of patient attributes are ranked or prioritized on the basis of which attributes will most effectively increase the confidence for the treatment recommendations. For example, a first set of ranked patient attributes (e.g., test results for hemoglobin A1 c, bronchoscopy, blood creatinine, parathyroid hormones, foot numbness, polysomnography, urinalysis) and associated treatment recommendations that are generated for display during an initial pass through the assembly, system, module or interface 12 may be evaluated against additional attribute input data when generating new treatment recommendations with the treatment recommendation system, module or interface 13, resulting in a second set of ranked patient attributes (e.g., test results for blood creatinine, magnetic resonance, bronchoscopy, parathyroid hormones, foot numbness, polysomnography, urinalysis) that may be generated for display with associated treatment recommendations. In response, the physician or medical expert can select and update one of the second set of ranked patient attributes with additional patient attribute data, and the sequence repeats until a desired level of confidence is obtained for the treatment recommendations.

Based on interactions with the patient attribute inputs, the evaluated treatment recommendations may be displayed by the iterative attribute acquisition engine 11 as an optimized visualization of patient attributes and treatment recommendations for the patient. To this end, the iterative attribute acquisition engine 11 may include a visualization optimizer 15 that is configured to display an optimized visualization of the prioritized patient attributes and treatment recommendations for the patient. The optimized visualization generated by the visualization optimizer 15 may specify the content and style for conveying comparative patient attributes and treatment options, such as by generating a patient case matrix interface with ranked patient attributes presented in a first column and with treatment options presented in a second column. Next to each ranked patient attribute, the patient case matrix interface may include a confidence improvement metric indicator which visually represents the confidence uncertainty metric that can be reduced by providing additional patient attribute data. In addition, the patient case matrix interface may include a patient care customization metric indicator for each patient which visually represents what percentage of the patient's attributes have been assembled, effectively representing the amount of uncertainty associated with the treatment recommendations for that patient. The displayed patient care customization metric indicator may also include a marginal customer care confidence uncertainty metric indicator that visually represents how much uncertainty can be reduced by providing additional patient attribute data.

Types of information handling systems that can utilize QA system 1 range from small handheld devices, such as handheld computer/mobile telephone 120 to large mainframe systems, such as mainframe computer 170. Examples of handheld computer 120 include personal digital assistants (PDAs), personal entertainment devices, such as MP3 players, portable televisions, and compact disc players. Other examples of information handling systems include pen, or tablet, computer 130, laptop, or notebook, computer 140, personal computer system 150, and server 160. As shown, the various information handling systems can be networked together using computer network 9. Types of computer network 9 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
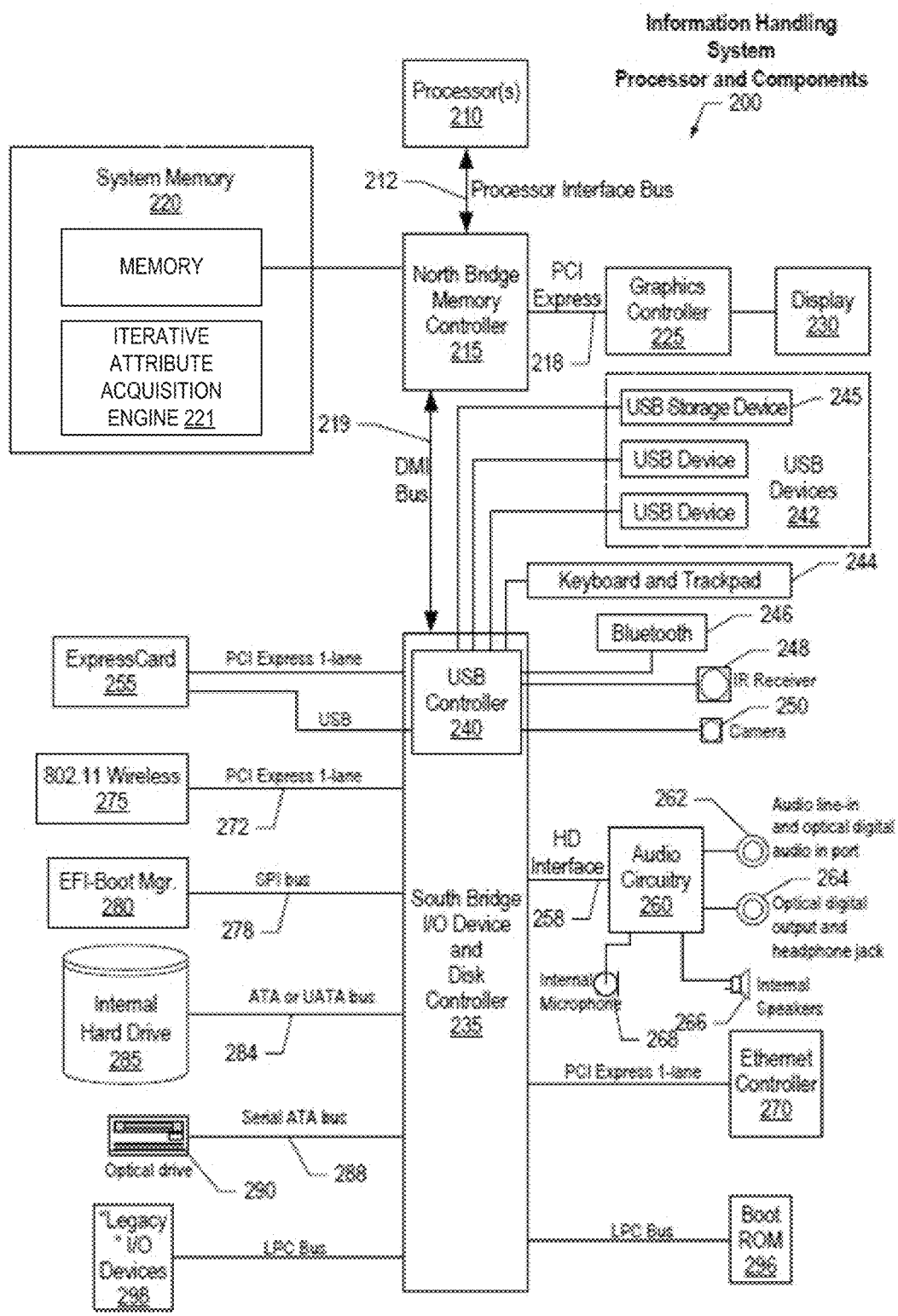
FIG. 2 is a block diagram of a processor and components of an information handling system such as shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including an optimized iterative attribute acquisition engine module 221 which may be invoked to dynamically optimize the acquisition of query attributes that would significantly improve the QA process by using cognitive computer assisted iterative disclosure techniques to identify query attributes that are ranked by the number of possible conclusions that can be deprioritized by each query attribute. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (lap is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
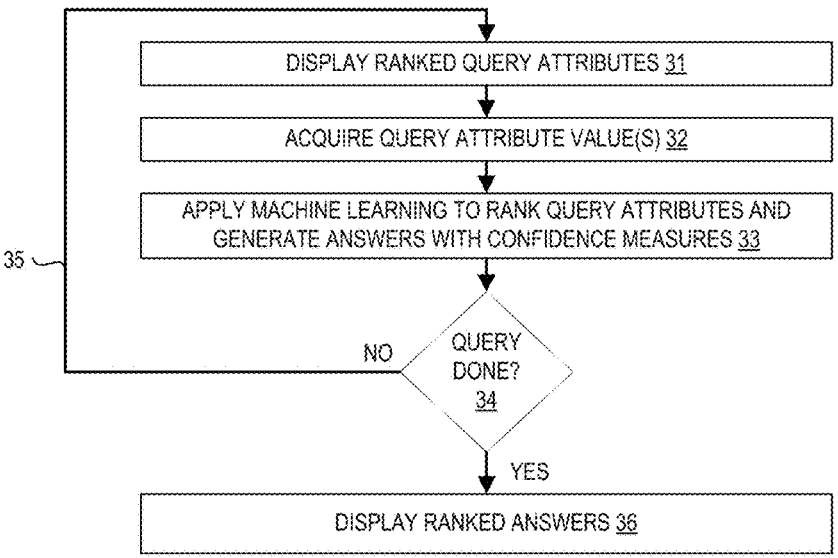
FIG. 3 is a simplified block diagram flow chart showing the logic for using a machine learning process to iteratively acquire query attributes and generate a list of ranked answers.

To provide additional details for an improved understanding of selected embodiments of the present disclosure, reference is now made to FIG. 3 which illustrates a simplified block diagram form chart 30 showing the logic for using a machine learning process to iteratively acquire query attributes and generate a list of ranked answers. As disclosed herein, the iterative acquisition of query attributes and the generation of ranked query attributes and answers therefrom may be performed by a cognitive system, such as the QA system 1 or any suitable information handling system.

As an initial step in the process 30 after the method starts (step 31), query attributes are received at step 32. In selected embodiments, the received query attributes may be attributes relating to the medical condition of a patient that are assembled from patient profile data (e.g., age and gender), clinical data, diagnostic data, medical data (e.g., referral requests, patient allergies, prescription renewals, lab reports, and other patient health data), and/or any health-related data; including but not limited to patient medical records, patient entered information, care team entered information, healthcare device generated information, billing information, etc. In other embodiments, the query attributes relate to questions in other fields besides medicine, such as finance, scientific research, engineering, software, or the like. In selected medical fields of application, the displayed query attributes may be patient attributes that are displayed for comparison and selection in a patient case matrix interface in which ranked patient attributes are listed in a first column and patient treatment recommendations are listed in a second column. As disclosed herein, the patient attributes may be ranked by a confidence improvement metric which quantities the confidence uncertainty that can be reduced by providing additional patient attribute data. In addition or in the alternative, each displayed patient attribute may include a confidence improvement metric indicator which visually represents the confidence uncertainty metric that can be reduced by providing additional patient attribute data. In addition or the alternative; the displayed query attributes may include a patient care customization metric indicator for each patient which visually represents what percentage of the patient's attributes have been assembled, effectively representing the amount of uncertainty associated with the treatment recommendations for that patient. The displayed patient care customization metric indicator may also include a marginal customer care confidence uncertainty metric indicator that visually represents how much uncertainty can be reduced by providing additional patient attribute data. Through user interaction with the displayed query attributes; the processing at step 32 may also include the acquisition of one or more query attribute values through user interaction, such as the selection and/or input of query attribute data by a user (e.g., a physician, medical assistance; patient or expert; who submits query interaction data or values for a selected query attribute). In whole or in part, the acquisition of query attributes may be automatically or programmatically implemented by retrieving data from memory storage. In selected embodiments, query interaction data may be patient attribute data, such as information or test result values that are entered for a selected patient attribute. The acquisition processing at step 32 may include the generation and display of a query attribute input field which the user may use to input patient attribute data or information, such as a diagnostic or medical test result value.

At step 33, a natural language processing (NLP) technique, such as machine learning and/or deep analytic analysis, may be applied to the query attributes, including any newly entered query attribute values, to generate answers or query responses along with associated confidence measures based on the current query attributes. In selected example embodiments, NLP-based machine learning techniques applied at step 33 may invoke association rules and/or pattern recognition logic which process patient attribute data, including acquired patient attribute values, to generate treatment recommendations having associated treatment confidence metric values for the current patient case.

At step 34, an NLP technique, such as machine learning and/or deep analytic analysis, may be applied to rank or re-rank the missing query attributes. In selected example embodiments, the NLP-based machine learning techniques applied at step 34 may apply machine learning techniques to calculate a confidence improvement metric value for each patient attribute which quantifies the confidence uncertainty that can be reduced by providing additional data or information for that patient attribute. Using the calculated confidence improvement metric values, the patient attributes can be ranked at step 34 to prioritize the patient attributes in terms of the marginal reduction in uncertainty that can be achieved by entering information to improve the confidence values for a set of treatment recommendations or options. In selected embodiments, the applied machine learning techniques may prioritize the patient attributes on the basis of a confidence hyper-value metric (e.g., an area, volume, or other multi-dimensional value, depending on the number of attributes), alone or in combination with a normalized representation of the confidence hyper-value metric, to measure the uncertainty in the confidence values for the options provided. As disclosed herein, the confidence hyper-value metric may be computed as the product of option confidence ranges for each patient attribute or piece of information. The patient attributes or information can then be ranked based on a marginal reduction in the confidence volume.

At step 35, the answers and associated confidence measures may be displayed for user viewing and interaction. As displayed, the answers are ordered or ranked by the associated confidence measure. For example, when a "treatment" tab on a user interface is selected by user manipulation of a screen cursor, the user interface may then display a plurality of treatment "answers" ranked by associated confidence measures.

At step 36, the missing query attributes may be displayed for user viewing and interaction, where the query attributes are ranked or ordered by each query attribute's impact to improve the answer confidence. For example, when a "investigation" tab on a user interface is selected by user manipulation of a screen cursor, the user interface may then display a plurality of missing query attributes that are ordered or ranked by the marginal reduction in uncertainty that can be achieved by entering information to improve the confidence values for a set of treatment recommendations or options (e.g., based on the marginal reduction in the confidence volume).

As indicated with the feedback path 38, the sequence of steps 32-36 can be repeated in an iterative loop for so long as the query process is ongoing (e.g., negative outcome to decision step 37). In this way, the computed confidence improvement metric values may be displayed with the ranked query attributes for use in allowing users to optimally improve their queries through a guided iterative approach. This capability is referred to as "iterative disclosure." However, once the query process is completed (e.g., affirmative outcome to decision step 37), the process 30 is done (step 39).

To provide additional details for an improved understanding of selected embodiments of the present disclosure, there is now disclosed and described a machine learning process to optimally improve the submission of queries to a cognitive system, such as the QA system 1 or any suitable information handling system, through a guided iterative approach which uses answer confidence values to identify and rank query attributes that should be submitted to reduce the confidence uncertainty for the answers. While described hereinbelow in the context of a health care treatment advisor which uses treatment confidence values to calculate a "Customer Care Measure" figure of merit, it will be appreciated that the present disclosure may be applied to a variety of different applications or fields. In the disclosed machine learning process, there is a fixed and finite set of query or patient attributes $S_A=\{A_1, A_2, A_3 \ldots A_m\}$ and a fixed and finite set of answer or treatment outcomes $S_T=\{T_1, T_2, T_3 \ldots T_n\}$. In this setting, a specific patient, $P_i$, may be characterized with a vector representation of the patient's attributes $a=[a_1, a_2, a_3 \ldots a_m]$ (when all in attributes are known) or with a vector representation $a'=[a_1, a_2, a_3 \ldots a_k, u_{k+1}, u_{k+2} \ldots u_m]$ (when only k attributes are known and the $u_i$ attribute values are not known). In addition, the answer or treatment outcomes for the specific patient $P_i$ may be characterized with a vector representation of the confidence values associated with each treatment $t=[t_1, t_2, t_3 \ldots t_n]$ for a given attribute vector a. Using these vector representations, the cognitive system maps each possible patient attribute vector to a treatment confidence vector space in order to determine the hyper-value metric (e.g., space or volume) encompassing the known patient attributes as a representation of the total confidence uncertainty measure for the set of answer or treatment outcomes.

Figure 4:
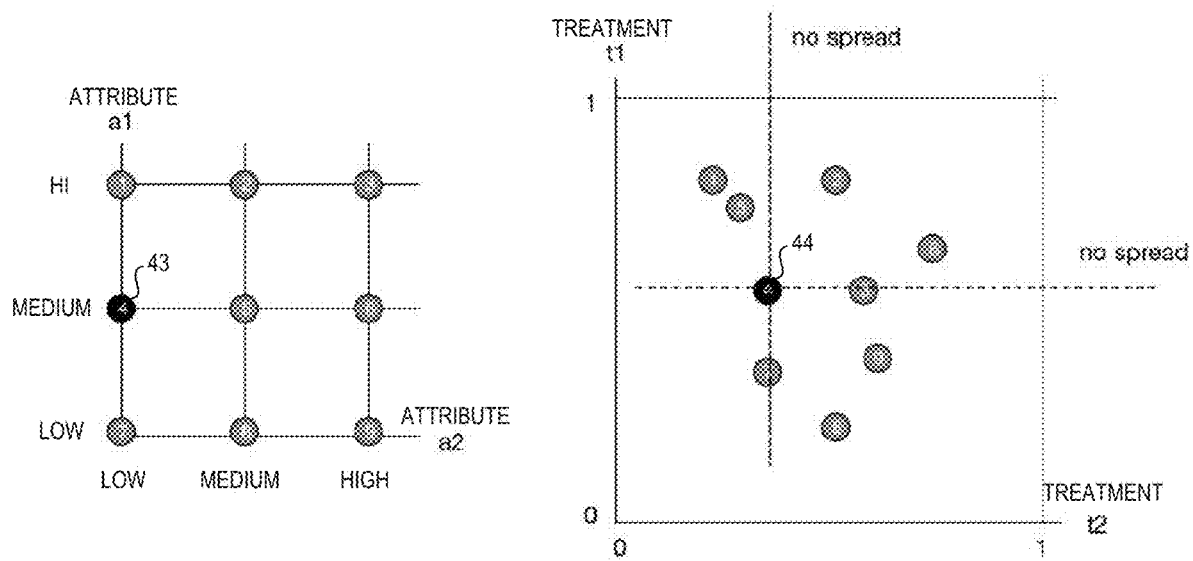
FIG. 4 illustrates a first mapping of attribute vectors to a confidence vector space where a specific attribute vector is known.
Figure 5:
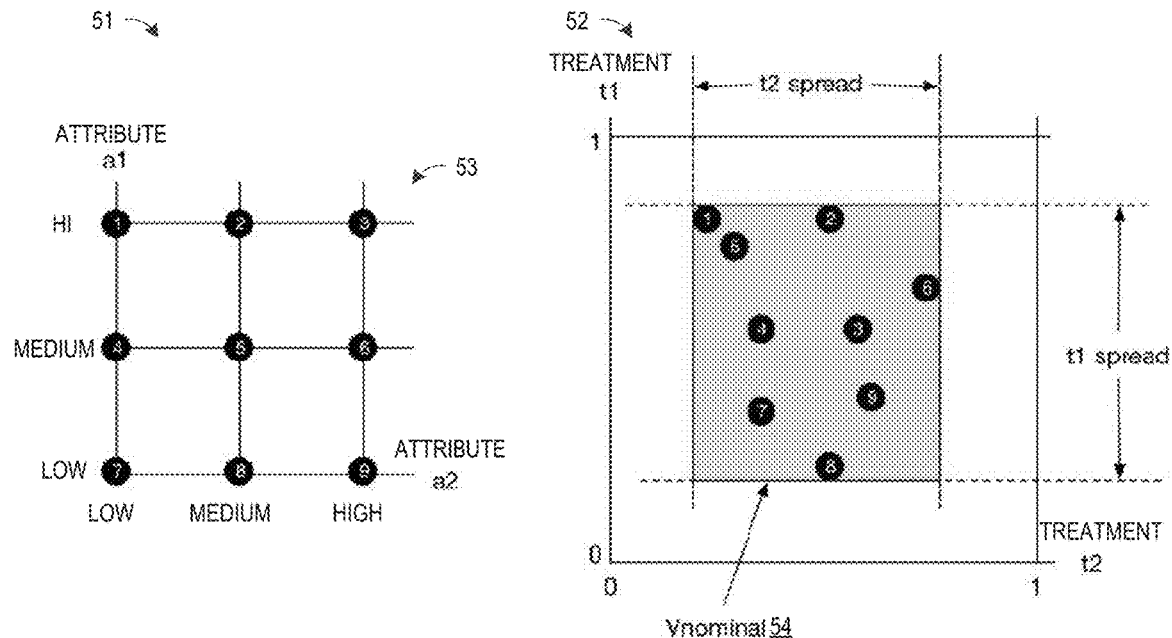
FIG. 5 illustrates a second mapping of attribute vectors to a confidence vector space where none of the attribute vector values are known.
Figure 6:
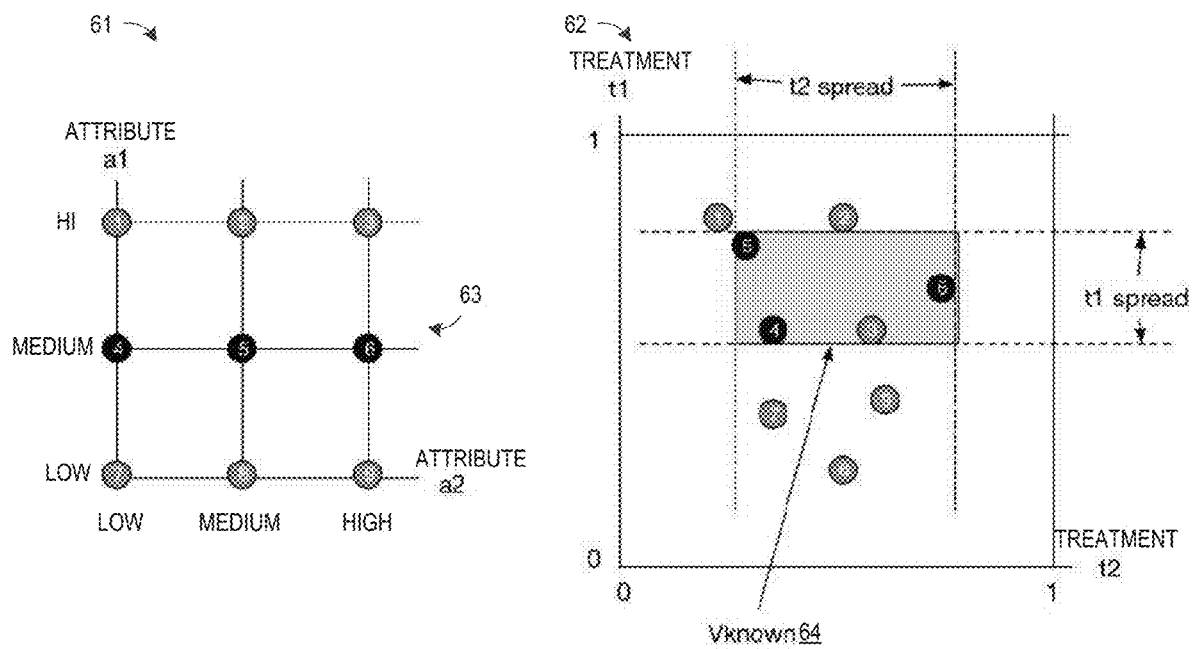
FIG. 6 illustrates a third mapping of attribute vectors to a confidence vector space where only some of the attribute vector values are known and others are unknown.

Turning now to FIGS. 4-6, there is provided a simplified example of the disclosed machine learning process for using answer confidence values to identify and rank query attributes that should be submitted to reduce the confidence uncertainty for the answer or treatment outcomes. In this simplified example, there are only two possible query attributes (e.g., patient attributes) a1, a2, each of which may have three values: low, medium, and high. It is assumed further that there are only two possible outcomes or answers (e.g., treatments) t1, t2. Representing the query attributes as an attribute vector, the cognitive system maps each possible patient attribute vector to a treatment confidence vector space in which each vector in the treatment confidence space represents the calculated confidence measure for each treatment. In FIG. 4, the first diagram 41 represents the attribute vector 43 in which all patient attributes are known with the value for the first attribute a1 (e.g., bronchoscopy) being "medium" and the value for the second attribute a2 (e.g., blood creatinine) being "low." In an assumed case where there are only two possible answers or treatments, t1 (e.g., low-dose aspirin) and t2 (e.g., Warfarin), the cognitive system maps each possible patient attribute vector 41 to a treatment confidence vector space 42 wherein each vector in the treatment confidence space represents the treatment confidence that is calculated by the cognitive system. In the example of FIG. 4 where all patient attributes are known, the cognitive system provides a single confidence 44 for each treatment option, resulting in a confidence range spread of zero (e.g., "no spread") for each treatment to indicate a mid-range confidence for the first treatment (e.g., low-dose aspirin (t1)) and a slightly lower confidence for the second treatment (e.g., Warfarin (t2)).

Referring now to FIG. 5, there is shown a second mapping of attribute vectors 51 to a confidence vector space 52 in a case where none of the attribute vector values are known. In particular, the first diagram 51 represents the attribute vector 53 in which none of the patient attributes are known, such that the values for the first attribute a1 (e.g., bronchoscopy) and the second attribute a2 (e.g., blood creatinine) could be "low," "medium" or "high." In this case where each possible patient attribute vector 51 is mapped to a treatment confidence vector space 52, the cognitive system is unable to choose a specific treatment confidence vector, and instead a range or spread of confidence values is determined for each treatment, including a first treatment range (e.g., t1 spread) and a second treatment range (e.g., t2 spread). By multiplying the spread in confidence for each treatment, the cognitive system may calculate the overall confidence uncertainty as a hyper-value. In the case of a two-dimensional treatment confidence space 52 where nothing is known about a patient attributes a1, a2, a nominal confidence uncertainty measure hyper-value is computed as a nominal volume (e.g., Vnominal) 54, where the term "volume" is used to represent confidence uncertainty for all possible dimensionalities.

Referring now to FIG. 6, there is shown a third mapping of attribute vectors 61 to a confidence vector space 62 where one or more of the attribute vector values are known and others are unknown. In particular, the first diagram 61 represents the attribute vector 63 in which one of the patient attributes are known such that the first attribute a1 (e.g., bronchoscopy) has a known "medium" value, but the second attribute a2 (e.g., blood creatinine) is not known. In this case where each possible patient attribute vector 61 is mapped to a treatment confidence vector space 62, the confidence uncertainty decreases and the cognitive system is able to calculate an associated uncertainty volume for the known patient attributes by multiplying the spread in confidence for each treatment range (e.g., t1 spread and t2 spread) to determine the overall confidence uncertainty as a known hyper-value (e.g., Vknown) 64. The uncertainty volume associated with a known set of attributes and another unknown attribute, A, is $V_A$. This volume will be less than or equal to Vknown—the volume of the known attributes.

As will be appreciated, the simplified example described with reference to FIGS. 4-6 can be extended to the case where there are m patient attributes in which case the number of patient attribute vectors will be the product of the number of possible values for each attribute, e.g. count(a)= count($a_1$)*count($a_2$)*count($a_3$) . . . count($a_m$). Even for a modest 10 attributes with three levels each, this would result in $3^{10}$=59,049 possible patient attribute vectors. For this reason, the mapping of patient attribute vectors to treatment confidence vectors (which involves expensive QA system pipeline calculations) should be executed in batches and the results should be stored for quick retrieval during application use. This is possible since the mapping will not change unless the corpus changes.

To provide additional details for an improved understanding of selected embodiments of the present disclosure, reference is now made to FIGS. 7-11 which illustrate a sequence of user interface display screens 70, 80, 90, 100, 110 to illustrate the iterative acquisition of patient attributes and resulting treatment recommendations based on computed confidence volume, customer care metric (CCM) and marginal CCM values which are used to optimally rank and display the patient attributes and treatment options presented to the user. As disclosed herein, the generation and display of the user interface display screens and the processing of user interactions therewith may be performed by a cognitive system, such as the QA system 1 or any suitable information handling system.

Figure 7:
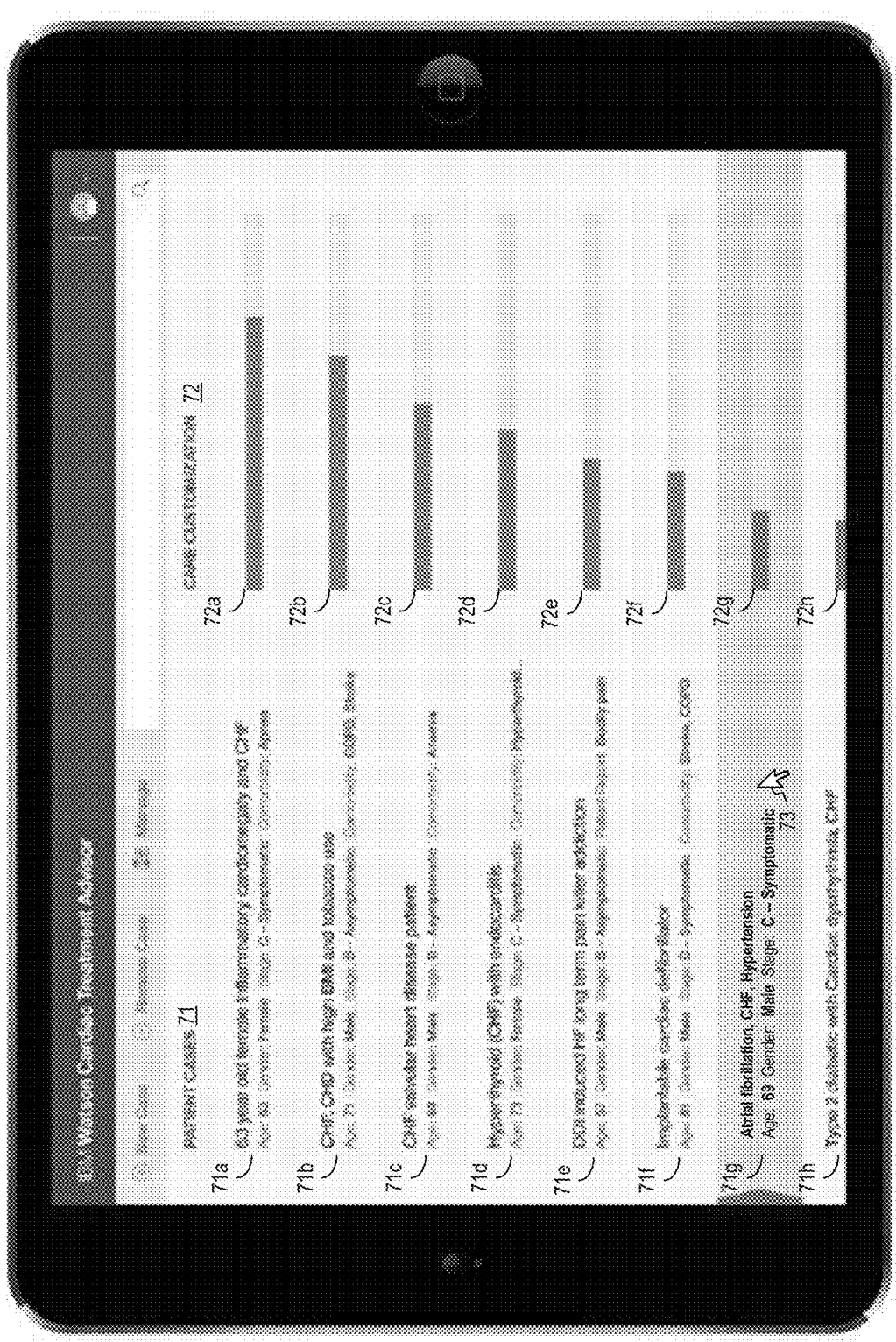
FIGS. 7-11 illustrate a sequence of display screens to illustrate the iterative acquisition of patient attributes and resulting treatment recommendations based on computed confidence volume, customer care metric (CCM), and marginal CCM increase values which are used to optimally rank and display the patient attributes and treatment options presented to the user.

Referring first to FIG. 7, there is shown a first user interface display screen 70 which lists one or more patient cases 71 with suitable descriptions 71a-h for each patient which are configured to be selected in response to user interaction, such as by using a screen touch or cursor 73. For each listed patient, the user interface display screen 70 may also display a patient care customization metric indicator 72 for each patient, where each indicator 72a-h visually represents what percentage of the patient's attributes have been assembled, effectively representing the amount of uncertainty associated with the treatment recommendations for that patient. Through user interaction with the touch screen or cursor, one of the patient cases (e.g., 71g) may be selected.

Figure 8:
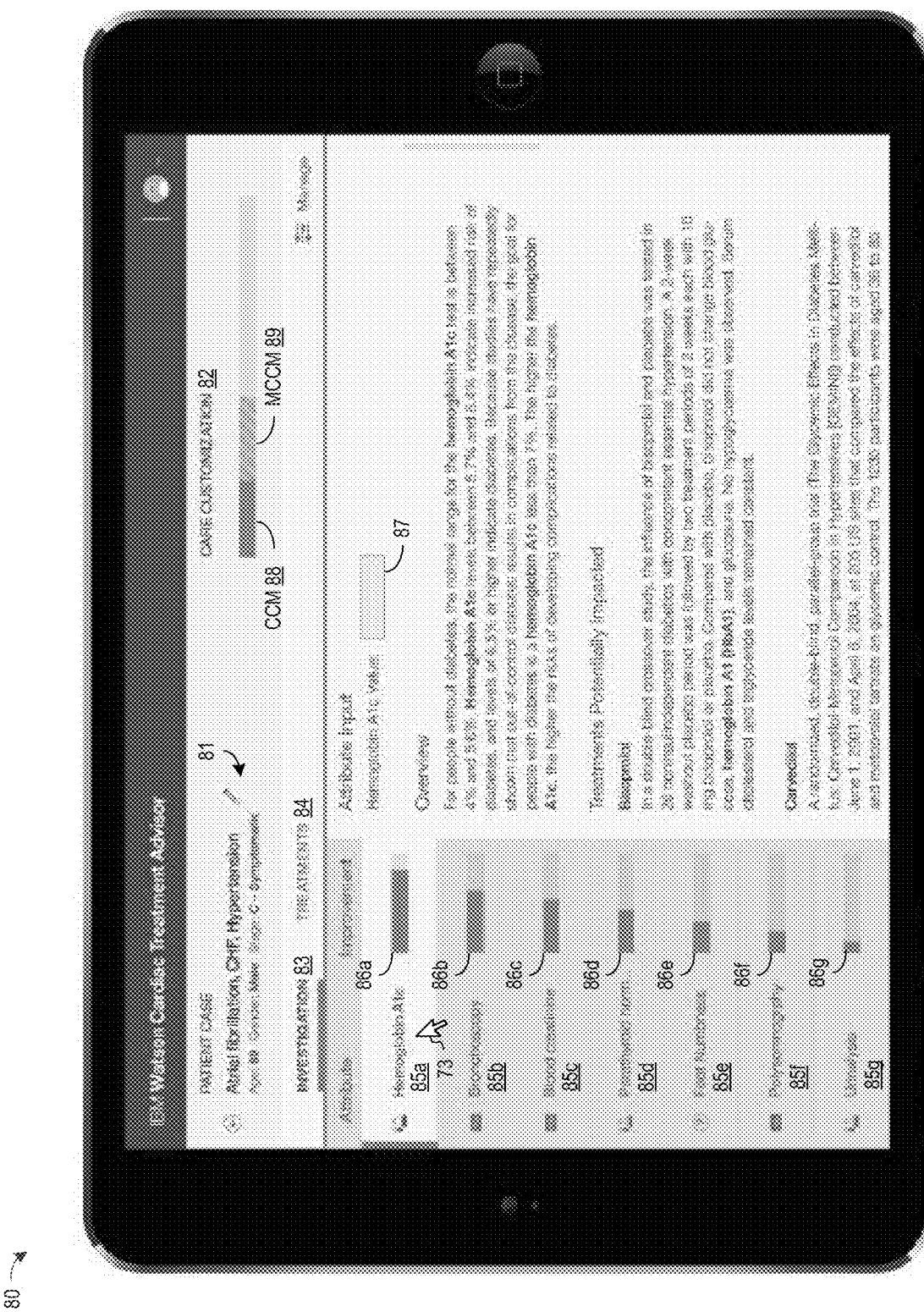

Referring now to FIG. 8, there is shown a second user interface display screen 80 after selection of the patient case 71g shown in FIG. 7. As illustrated, the second user interface display screen 80 may include a description panel 81 for the selected patient, the corresponding patient care customization metric indicator 82, an investigation screen tab 83, and a treatments screen tab 84.

The patient description panel 81 may display patient information, such as demographic and medical data for the selected patient case. For example, the depicted patient description panel 81 identifies the selected patient's medical data as "Atrial fibrillation, CHF, Hypertension," and identifies the selected patient's demographic data as "Age: 69 Gender: Male Stage: C—Symptomatic."

The patient care customization metric indicator 82 may include a customer care measure (CCM) 88 which visually represents what percentage of the patient's attributes have been assembled, effectively representing the amount of uncertainty associated with the treatment recommendations for that patient. In selected embodiments, the current customer care measure (CCM) may be calculated from confidence volume values as CCM=1−(Vknown/Vempty), where Vknown is the confidence volume for a set of known attributes (represented by the vector a') and where Vempty is the confidence volume when no patient attributes are known. The patient care customization metric indicator 82 may also include an MCCM indicator 89 of the marginal improvement in the customer care measure that visually represents how much uncertainty can be reduced by providing additional patient attribute data for a selected patient attribute. In selected embodiments, the marginal MCCM increase for an attribute A may be calculated from confidence volume values as MCCM=$(V_A-Vknown)/Vempty$, where $V_A$ is the confidence volume for a set of known attributes and one additional attribute A, where Vknown is the confidence volume for a set of known attributes (represented by the vector a'), and where Vempty is the confidence volume when no patient attributes are known.

When selected, the investigation screen tab 83 lists a plurality of patient attributes 85 for the selected patient case which are configured to be selected in response to user interaction, such as by using a touch or screen cursor 73, with each selected patient attribute including a panel description of the patient attribute, such as an overview and review of potentially impacted treatments. Next to each listed patient attribute 85a-g is a corresponding improvement measure 86a-g which identifies or quantifies the available improvement in treatment confidence that can be achieved by specifying additional input values for the patient attribute. Computed as a hyper-value metric product of treatment confidence ranges encompassing the patient attributes 85a-g, the improvement measures 86a-g quantify a marginal reduction in the confidence uncertainty measures, and may be used to rank the display of patient attributes 85a-g on the basis of which additional attribute input data will most effectively increase the confidence for the treatment recommendations. The data values for each patient attribute 85a-g may have a continuous or categorical and fixed value associated therewith that is either stored in memory or input by the user. To allow user input of patient attribute values, the second user interface display screen 80 may be configured to respond to user interaction selection of a patient attribute (e.g., Hemoglobin A1e 85a) to display an attribute input field 87 (e.g., Hemoglobin A1e input value) that is presented for user input of data relating to the selected patient parameter.

When the treatments screen tab 84 is selected, the user interface display screen 80 may list a plurality of treatment recommendations (e.g., "low-dose aspirin," "Warfarin," "Metoprolol") for the selected patient case which are generated from the patient attribute data. In addition, treatment details may be displayed for each selected treatment recommendation, including supporting evidence for treatment, core performance measures, etc. Next to each treatment recommendation, a corresponding treatment confidence measure indicator may be displayed which identifies the confidence calculated for the treatment by the cognitive system.

In general terms, the patient attributes 85a-g displayed in the investigation screen tab 81 are selected from a fixed and finite set of patient attributes $S_A = \{A_1, A_2, A_3 \ldots A_m\}$. In addition, the specific attributes 85 for a selected patient P; may be represented in vector form as attribute vector $a=[a_1, a_2, a_3 \ldots a_m]$, while the attribute vector $a'=[a_1, a_2, a_3 \ldots a_k, u_{k+1}, u_{k+2} \ldots u_m]$ may be used to provide a vector representation of a specific patient's attributes when one or more attributes are unknown, where the values $u_i$ are null. In addition, the treatment confidence measures may be represented in vector form as a treatment confidence vector $t=[t_1, t_2, t_3 \ldots t_n]$ for a given attribute vector, a. Each treatment confidence value may have a continuous value ranging from 0 to 1 inclusive that is either stored in memory or generated by the cognitive system.

Figure 9:
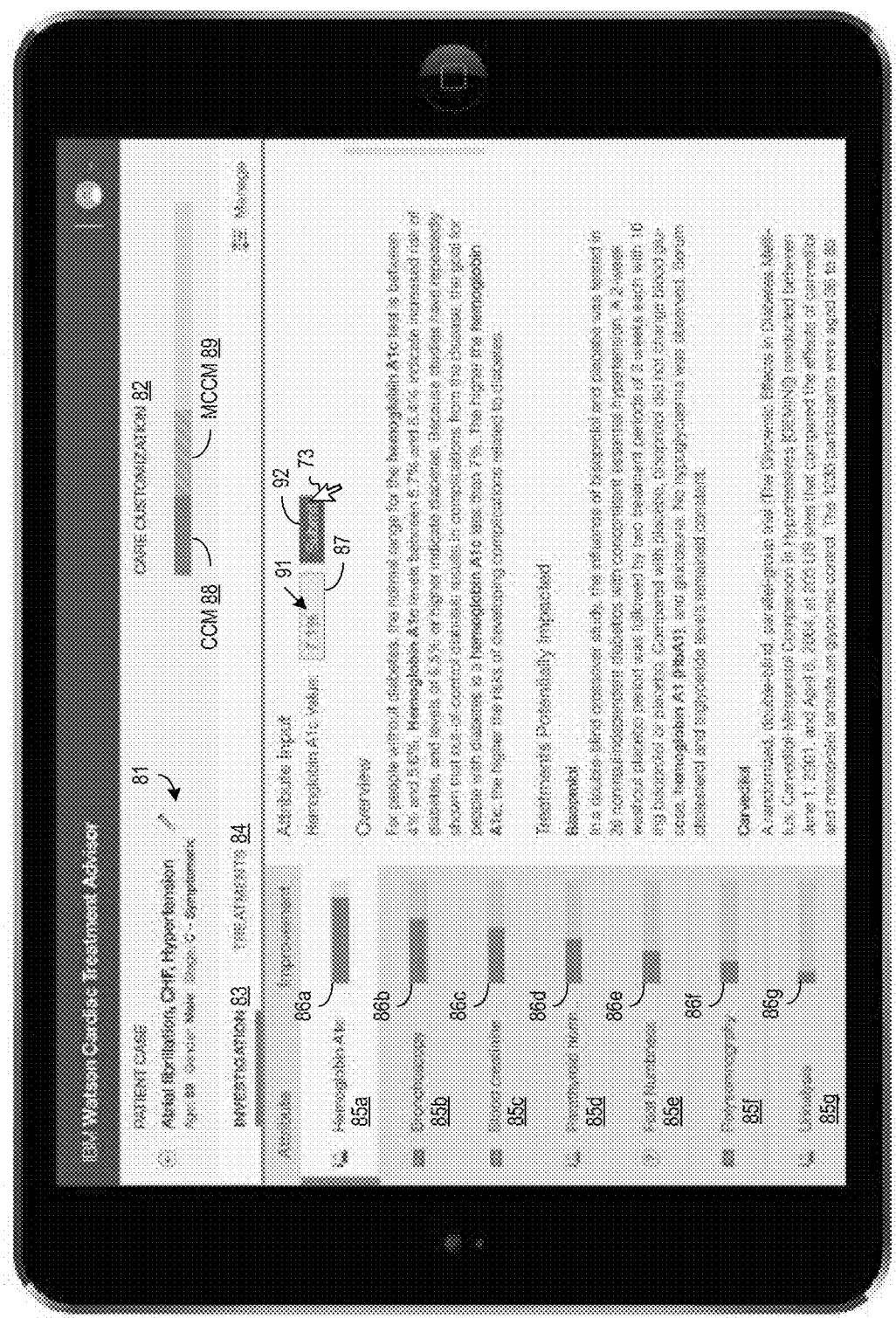

Referring now to FIG. 9, there is shown a third user interface display screen 90 after input of patient attribute data 91 at the input field 87. As illustrated, the third user interface display screen 90 includes the same patient case description panel 81, patient care customization metric indicator 82, investigation screen tab 83, and treatments screen tab 84. As shown at this stage, the ranking and improvement outcomes for the listed patient attributes 85, 86 are not changed until after the additional patient attribute input data is entered in response to user interaction, such as by using a screen touch or cursor 73 to activate a "submit" button 92.

Figure 10:
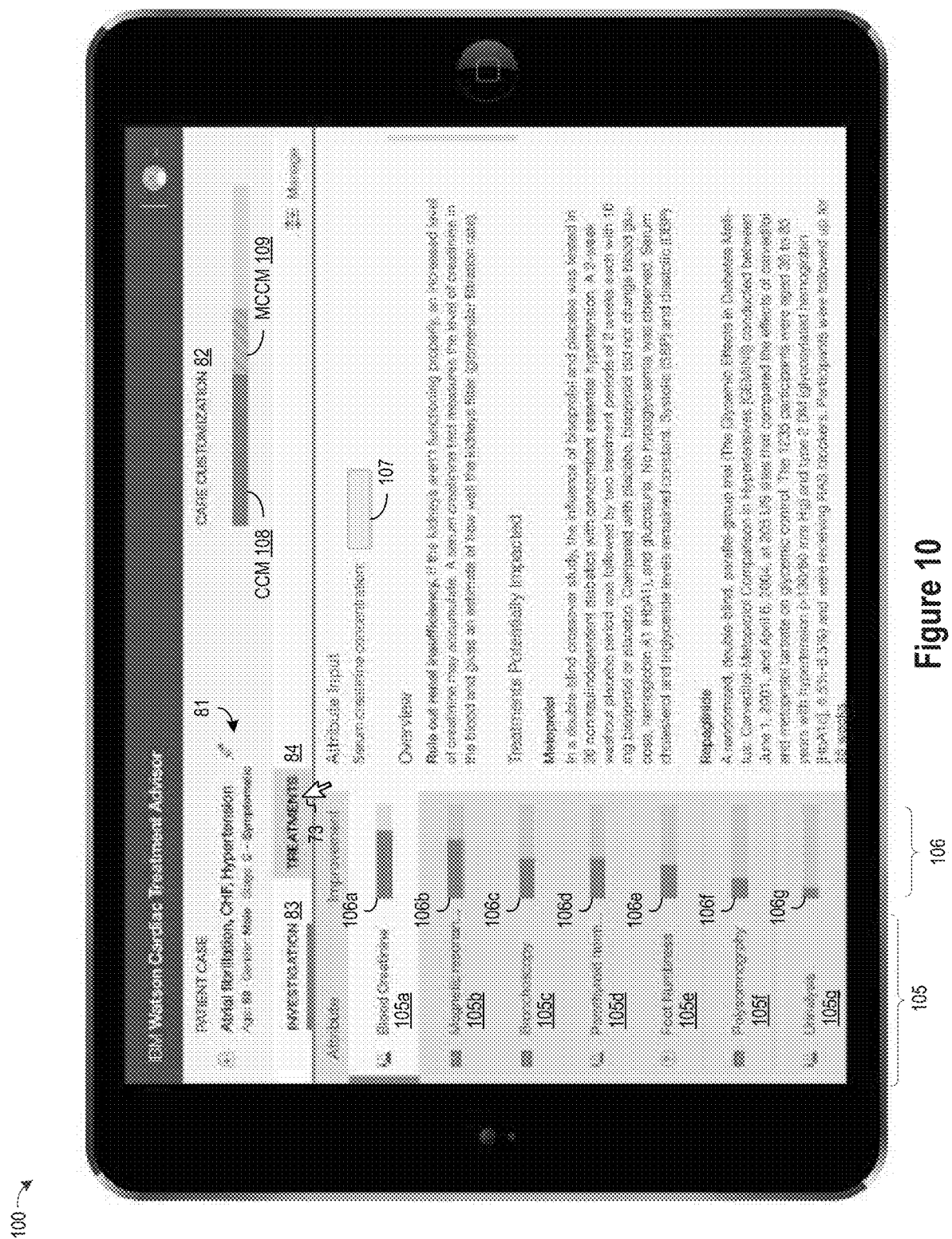

Referring now to FIG. 10, there is shown a fourth user interface display screen 100 after submission of the additional patient attribute input data as shown in FIG. 9. As illustrated, the fourth user interface display screen 100 includes the same description panel 81 for the selected patient and patient care customization metric indicator 82, but now updated with a new CCM indicator 108 which reflects the reduced amount of uncertainty associated with the treatment recommendations for that patient after submission of the patient attribute input data. In addition, the patient care customization metric indicator 82 is updated with a new MCCM indicator 109 to reflect how much uncertainty can be reduced by providing additional patient attribute data for a newly selected or top-ranked patient attribute (e.g., patient attribute 105a). In addition, the investigation screen tab 83 and treatments screen tab 84 in the fourth user interface display screen 100 are updated to reflect a new ranking of patient attributes 105, improvement measures 106, and recommended treatments (not shown). For example, in the new ranking of patient attributes 105a-g are shown with corresponding improvement measures 106a-g which are sorted or ranked to identify which additional attribute input data will most effectively increase the confidence for the treatment recommendations. Under the new ranking, the listing of patient attributes 105a-g (e.g., blood creatinine, magnetic resonance, bronchoscopy, parathyroid hormones, foot numbness, polysomnography, urinalysis) replaces the listing of patient attributes 85a-g (e.g., hemoglobin A1c, bronchoscopy, blood creatinine, parathyroid hormones, foot numbness, polysomnography, urinalysis). As a result of the new ranking of patient attributes 105, the investigation screen tab 83 on the fourth user interface display screen 100 may include a new patient attribute input field 107 and panel description of the selected or top ranked patient attribute (e.g., 105a) which may include an overview and review of potentially impacted treatments for this patient attribute (e.g., blood creatinine).

Figure 11:
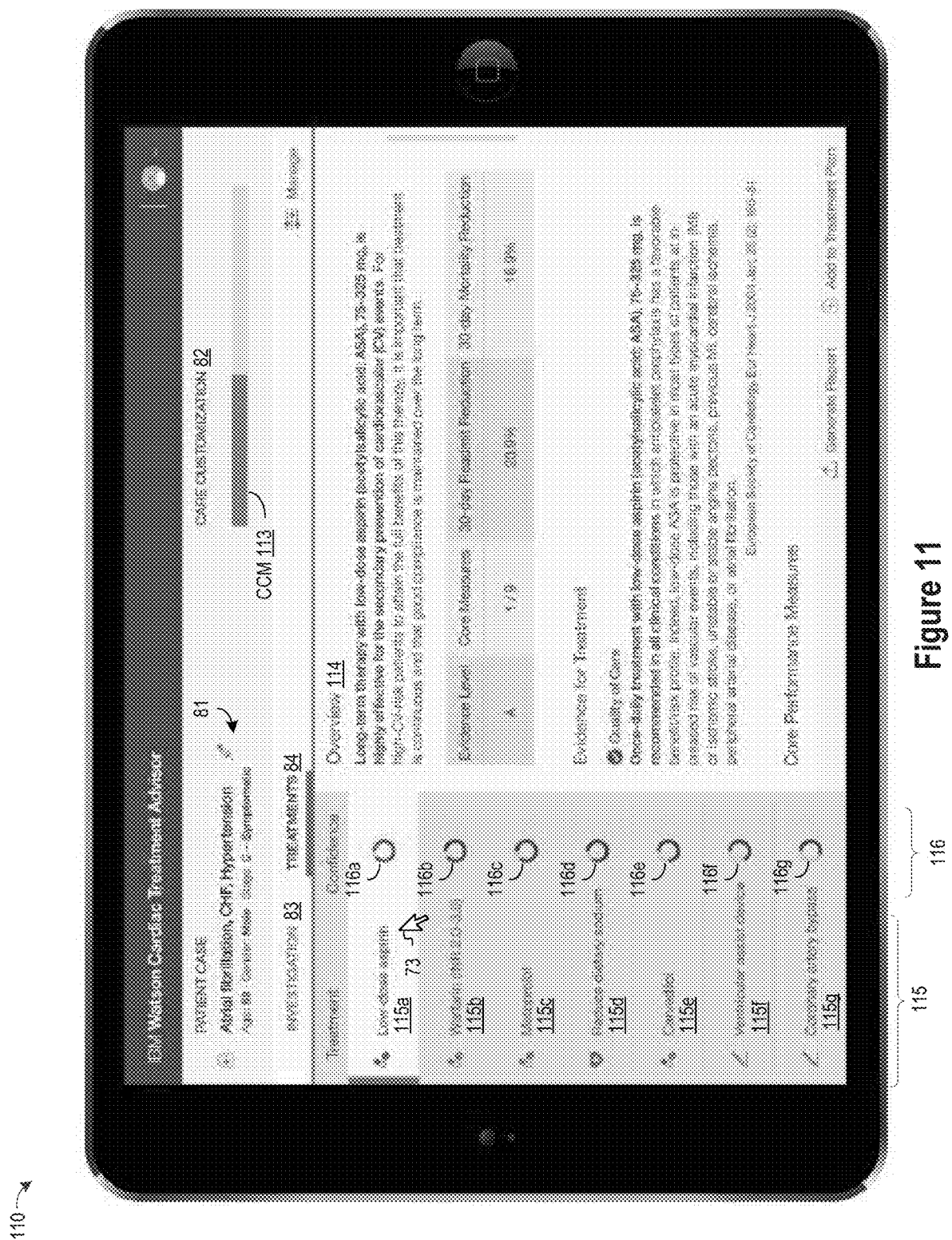

Referring now to FIG. 11, there is shown a fifth user interface display screen 110 after the treatments screen tab 84 is selected, such as by using a touch or screen cursor 73 as shown in FIG. 10. As illustrated, the fifth user interface display screen 110 includes a list of treatment recommendations 115 (e.g., "low-dose aspirin," "Warfarin," "Metoprolol," etc.) for the selected patient case which are generated by the cognitive system from the patient attribute data. In addition, treatment details for a selected treatment recommendation may be displayed in a display panel 114, including an overview description with supporting evidence for treatment, core performance measures, etc. Next to each treatment recommendation 115a-g, a corresponding treatment confidence measure indicator 116a-g may be displayed which identifies the confidence calculated for the treatment by the cognitive system. While any indicator icon may be used, selected embodiments of the treatment confidence measure indicator 116a-g employ a completion ring icon visually represents the confidence measure as a percentage of ring that is colored or shaded to represent the amount of confidence associated with the treatment recommendation.

Selected embodiments of the present disclosure are described with reference to a QA system for displaying optimized treatment recommendations and outcomes on the basis of patient-specified input parameters (e.g., patient profile and medical data, patient-specified attributes, importance and impact factors, etc.), though other information handling systems or computing devices may be used. As disclosed and described herein, the processing implemented by the cognitive system, such as a QA system 1, is operative to update and guide the acquisition of query attributes whenever the corpus is ingested or updated with new query attributes, at which point the cognitive system maps each possible attribute vector, a, to a single treatment confidence vector, t. The number of treatments in $S_T$ may differ from the number of confidence vectors, t. For any patient with a set of known and unknown patient attributes, a', the cognitive system will calculate and current CCM for display on the user interface display screen. For each unknown attribute, the cognitive system will calculate the marginal CCM for display on the user interface display screen and for use in ranking the patient attributes displayed thereon to guide an iterative attribute input process. However implemented, it will be appreciated that the present disclosure may employ a user interface to generate and display personalized treatment recommendations with associated treatment outcomes for visual comparison by iteratively guiding the patient attribute input process to improve the treatment recommendations by identifying which patient attributes should be updated to most effectively reduce the uncertainty in the confidence for the treatment recommendations.

By now, it will be appreciated that there is disclosed herein a system, method, apparatus, and computer program product for displaying query items to a user at an information handling system having a processor and a memory. As disclosed, the system, method, apparatus, and computer program product generate a plurality answer items (e.g., medical treatment recommendations for a selected patient) having a corresponding plurality of confidence values from a plurality of query items (e.g., medical attributes for the selected patient) comprising one or more specified query items and one or more unspecified query items. In addition, the information handling system performs a ranking analysis of query items by computing a current answer confidence metric for the specified query items and a marginal answer confidence improvement metric for each unspecified query item in the first plurality of query items. In selected embodiments, the ranking analysis may be performed by generating a first vector representation $a=[a_1, a_2, a_3 \ldots a_m]$ of m specified query items; generating a second vector representation $a'=[a_1, a_2, a_3 \ldots a_k, u_{k+1}, u_{k+2} \ldots u_m]$ of the plurality of query items comprising k specified query items and unspecified query items $u_i$; mapping the first and second vector representations to vector representations of the confidence values for each answer item; and calculating confidence hyper-value metrics from the vector representations of the confidence values to compute the current answer confidence metric and the marginal answer confidence improvement metric. In other embodiments, the ranking analysis may be performed by running a cognitive analysis comparison of each marginal answer confidence improvement metric for each unspecified query item in the first plurality of query items to rank the query items in sorted order from largest to smallest marginal answer confidence improvement metric. Once the query items are ranked, the information handling system may display one or more unspecified query items in sorted order based on the marginal answer confidence improvement metric for each unspecified query item. In displaying the query items; the information handling system may prioritize a first query item having a largest marginal answer confidence improvement metric. Once the query items are displayed, the information handling system may obtain user-specified attribute data for at least one of the first plurality query items, and then perform a second ranking analysis of query items by computing an updated current answer confidence metric for the specified query items and an updated marginal answer confidence improvement metric for each unspecified query item in the first plurality of query items, and then display the unspecified query item(s) in sorted order based on the updated marginal answer confidence improvement metric for each unspecified query item. In selected embodiments, the steps of performing the ranking analysis and displaying the one or more unspecified query items in sorted order are repeated in response to additional query attribute data for at least one of the first plurality query items to provide an iterative guided approach for generating answer items.

While particular embodiments of the present invention have been shown and described, it will be obvious to those skilled in the art that, based upon the teachings herein, changes and modifications may be made without departing from this invention and its broader aspects, Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for displaying query items, the method comprising:
performing, at the information handling system, a ranking analysis of the plurality of query items by computing a current answer confidence metric for the specified query items and a marginal answer confidence improvement metric quantifying how much answer uncertainty can be reduced by providing additional attribute data for each unspecified query item in the plurality of query items; and
displaying in ranked order based on the marginal answer confidence improvement metric for each unspecified query item, the one or more unspecified query items along with corresponding marginal answer confidence improvement metrics to visually show how much uncertainty can be reduced by providing additional attribute data for each unspecified query item.

2. The method of claim 1, where the plurality of query items comprises medical attributes for a selected patient and where the plurality of answer items comprises medical treatment recommendations for the selected patient that are generated from the medical attributes for the selected patient.

3. The method of claim 1, where performing the ranking analysis comprises:
generating, by the information handling system, a first vector representation $a=[a_1, a_2, a_3 \ldots a_m]$ of m specified query items;
generating, by the information handling system, a second vector representation $a'=[a_1, a_2, a_3 \ldots a_k, u_{k+1}, u_{k+2} \ldots u_m]$ of the plurality of query items comprising k specified query items and i unspecified query items, where k+i=m;
mapping, by the information handling system, the first and second vector representations to vector representations of the confidence values for each answer item; and
calculating, by the information handling system, confidence hyper-value metrics from the vector representations of the confidence values to compute the current answer confidence metric and the marginal answer confidence improvement metric.

4. The method of claim 1, where displaying the one or more unspecified query items in ranked order comprises prioritizing a first query item having a largest marginal answer confidence improvement metric.

5. The method of claim 1, further comprising obtaining, by the information handling system, user-specified attribute data for at least one of the first query items.

6. The method of claim 5, further comprising:
performing, at the information handling system, a second ranking analysis of query items after obtaining the user-specified attribute data by computing an updated current answer confidence metric for the specified query items and an updated marginal answer confidence improvement metric for each unspecified query item in the plurality of query items; and
displaying, by the information handling system, one or more unspecified query items in ranked order based on the updated marginal answer confidence improvement metric for each unspecified query item.

7. The method of claim 1, further comprising repeating the steps of performing the ranking analysis and displaying the one or more unspecified query items in ranked order in response to additional query attribute data for at least one of the plurality query items to provide an iterative guided approach for generating answer items.

8. The method of claim 1, where performing the ranking analysis comprises running a cognitive analysis comparison of each marginal answer confidence improvement metric for each unspecified query item in the plurality of query items to rank the query items in ranked order from largest to smallest marginal answer confidence improvement metric.

9. An information handling system comprising:
one or more processors;
a memory coupled to at least one of the processors;
a set of instructions stored in the memory and executed by at least one of the processors to display query items, wherein the set of instructions are executable to perform actions of:
performing, at the system, a ranking analysis of the plurality of query items by computing a current answer confidence metric for the specified query items and a marginal answer confidence improvement metric quantifying how much answer uncertainty can be reduced by providing additional attribute data for each unspecified query item in the plurality of query items; and
displaying, in ranked order based on the marginal answer confidence improvement metric for each unspecified query item, the one or more unspecified query items along with corresponding marginal answer confidence improvement metrics to visually show how much uncertainty can be reduced by providing additional attribute data for each unspecified query item.

10. The information handling system of claim 9, where the plurality of query items comprises medical attributes for a selected patient and where the plurality of answer items comprises medical treatment recommendations for the selected patient that are generated from the medical attributes for the selected patient.

11. The information handling system of claim 9, where wherein the set of instructions are executable to perform the ranking analysis by:
generating a first vector representation $a=[a_1, a_2, a_3 \ldots a_m]$ of m specified query items;
generating a second vector representation $a'=[a_1, a_2, a_3 \ldots a_k, u_{k+1}, u_{k+2} \ldots u_m]$ of the plurality of query items comprising k specified query items and unspecified query items $u_i$;
mapping the first and second vector representations to vector representations of the confidence values for each answer item; and
calculating confidence hyper-value metrics from the vector representations of the confidence values to compute the current answer confidence metric and the marginal answer confidence.

12. The information handling system of claim 9, wherein the set of instructions are executable to display the one or more unspecified query items in ranked order by prioritizing a first query item having a largest marginal answer confidence improvement metric.

13. The information handling system of claim 9, further comprising a set of instructions that are executable to perform actions of obtaining user-specified attribute data for at least one of the plurality query items.

14. The information handling system of claim 13, further comprising a set of instructions that are executable to perform actions of:
performing a second ranking analysis of query items after obtaining the user-specified attribute data by computing an updated current answer confidence metric for the specified query items and an updated marginal answer confidence improvement metric for each unspecified query item in the plurality of query items; and
displaying one or more unspecified query items in ranked order based on the updated marginal answer confidence improvement metric for each unspecified query item.

15. The information handling system of claim 9, further comprising a set of instructions that are executable to repeat the steps of performing the ranking analysis and displaying the one or more unspecified query items in ranked order in response to additional query attribute data for at least one of the plurality query items to provide an iterative guided approach for generating answer items.

16. The information handling system of claim 9, wherein the set of instructions are executable to perform the ranking analysis by running a cognitive analysis comparison of each marginal answer confidence improvement metric for each unspecified query item in the plurality of query items to rank the query items in ranked order from largest to smallest marginal answer confidence improvement metric.

17. A computer program product comprising a computer readable storage medium having computer instructions stored therein that, when executed by an information handling system, cause the system to display query items by:
performing, at the system, a ranking analysis of the plurality of query items by computing a current answer confidence metric for the specified query items and a marginal answer confidence improvement metric quantifying how much answer uncertainty can be reduced by providing additional attribute data for each unspecified query item in the plurality of query items; and
displaying, in ranked order based on the marginal answer confidence improvement metric for each unspecified query item, the one or more unspecified query items along with corresponding marginal answer confidence improvement metrics to visually show how much uncertainty can be reduced by providing additional attribute data for each unspecified query item.

18. The computer program product of claim 17, where the plurality of query items comprises medical attributes for a selected patient and where the plurality of answer items comprises medical treatment recommendations for the selected patient that are generated from the medical attributes for the selected patient.

19. The computer program product of claim 17, where performing the ranking analysis comprises:
generating a first vector representation $a=[a_1, a_2, a_3 \ldots a_m]$ of m specified query items;
generating a second vector representation $a'=[a_1, a_2, a_3 \ldots a_k, u_{k+1}, u_{k+2} \ldots u_m]$ of the plurality of query items comprising k specified query items and unspecified query items $u_i$;
mapping the first and second vector representations to vector representations of the confidence values for each answer item; and
calculating confidence hyper-value metrics from the vector representations of the confidence values to compute the current answer confidence metric and the marginal answer confidence improvement metric.

20. The computer program product of claim 17, where displaying the one or more unspecified query items in ranked order comprises prioritizing a first query item having a largest marginal answer confidence improvement metric.

21. The computer program product of claim 17, further comprising computer instructions that, when executed by the information handling system, cause the system to obtain user-specified attribute data for at least one of the plurality query items.

22. The computer program product of claim 21, further comprising computer instructions that, when executed by the information handling system, cause the system to display query items by:
performing a second ranking analysis of query items after obtaining the user-specified attribute data by computing an updated current answer confidence metric for the specified query items and an updated marginal answer confidence improvement metric for each unspecified query item in the plurality of query items; and
displaying one or more unspecified query items in ranked order based on the updated marginal answer confidence improvement metric for each unspecified query item.

23. The computer program product of claim 17, further comprising computer instructions that, when executed by the information handling system, cause the system to repeat the steps of performing the ranking analysis and displaying the one or more unspecified query items in ranked order in response to additional query attribute data for at least one of the plurality query items to provide an iterative guided approach for generating answer items.

24. The computer program product of claim 17, where performing the ranking analysis comprises running a cognitive analysis comparison of each marginal answer confidence improvement metric for each unspecified query item in the plurality of query items to rank the query items in ranked order from largest to smallest marginal answer confidence improvement metric.

* * * * *